US009542616B1

(12) United States Patent
Keahey et al.

(10) Patent No.: US 9,542,616 B1
(45) Date of Patent: Jan. 10, 2017

(54) DETERMINING USER PREFERENCES FOR DATA VISUALIZATIONS

(71) Applicant: International Business Machines Corporation, Armonk, NY (US)

(72) Inventors: T. Alan Keahey, Naperville, IL (US); Daniel J. Rope, Reston, VA (US); Graham J. Wills, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/753,196

(22) Filed: Jun. 29, 2015

(51) Int. Cl.
| | |
|---|---|
| *G06K 9/00* | (2006.01) |
| *G06K 9/34* | (2006.01) |
| *G06K 9/62* | (2006.01) |
| *G06K 9/52* | (2006.01) |
| *G06K 9/46* | (2006.01) |
| *G06F 17/30* | (2006.01) |

(52) U.S. Cl.
CPC .............. *G06K 9/52* (2013.01); *G06F 17/3053* (2013.01); *G06F 17/30058* (2013.01); *G06F 17/30554* (2013.01); *G06F 17/30696* (2013.01); *G06F 17/30991* (2013.01); *G06K 9/4652* (2013.01); *G06K 9/6267* (2013.01); *G06F 17/30* (2013.01)

(58) Field of Classification Search
CPC ......... G06K 9/52; G06K 9/6267; G06F 17/30; G06F 17/3053; G06F 17/30696; G06F 17/30554; G06F 17/30991; G06F 17/30058
USPC ........................................ 382/165, 173, 224
See application file for complete search history.

(56) References Cited

U.S. PATENT DOCUMENTS

| | | | |
|---|---|---|---|
| 7,584,415 B2 | 9/2009 | Cory et al. | |
| 2008/0065685 A1* | 3/2008 | Frank ................ | G06F 17/30241 |
| 2009/0327883 A1* | 12/2009 | Robertson ......... | G06F 17/30058 715/273 |
| 2011/0261049 A1* | 10/2011 | Cardno .................. | G06Q 10/10 345/419 |
| 2012/0313949 A1 | 12/2012 | Rope et al. | |
| 2013/0265319 A1 | 10/2013 | Fisher et al. | |

(Continued)

OTHER PUBLICATIONS

Bista et al., "Multifaceted Visualisation of Annotated Social Media Data," 2014 IEEE International Congress on Big Data, 2014, p. 699-706, IEEE Computer Society.

(Continued)

*Primary Examiner* — Kanjibhai Patel
(74) *Attorney, Agent, or Firm* — Robert C. Bunker (57) ABSTRACT

A method for determining user preferences for data visualizations is provided. The method may include receiving data visualizations. The method may also include collecting the shapes, the line segments, and the colors associated with the data visualizations. The method may further include converting the shapes and the line segments to polygonal outlines. Additionally, the method may include categorizing and measuring the line segments. The method may further include identifying and categorizing the angles formed by the line segments and determining weighted values for the angles. The method may further include calculating the total length for the line segments, and the total weighted value for the angles. The method may also include characterizing the line segments based on the categorization of the line segments and the angles based on the categorization of the angles. The method may further include scoring the at least one data visualization based on the characterizations.

20 Claims, 7 Drawing Sheets

(56) References Cited

U.S. PATENT DOCUMENTS

| | | |
|---|---|---|
| 2014/0004489 A1 | 1/2014 | Kim et al. |
| 2014/0025690 A1 | 1/2014 | Tareen et al. |
| 2014/0039975 A1 | 2/2014 | Hill |
| 2014/0049546 A1 | 2/2014 | Wang et al. |
| 2014/0052731 A1 | 2/2014 | Dahule et al. |
| 2014/0108135 A1 | 4/2014 | Osborn |
| 2014/0205977 A1 | 7/2014 | Bak et al. |
| 2014/0214335 A1 | 7/2014 | Siefert |
| 2014/0267367 A1 | 9/2014 | Chong et al. |
| 2014/0278738 A1 | 9/2014 | Feit et al. |
| 2015/0278371 A1* | 10/2015 | Anand ............... G06F 17/3053 707/723 |
| 2015/0339301 A1* | 11/2015 | Paalborg ............... G06F 17/30 715/716 |

OTHER PUBLICATIONS

Cooper et al., "The Effects of Data and Graph Type on Concepts and Visualizations of Variability," Journal of Statistics Education, 2010, p. 1-16, vol. 18, No. 2.

Mell et al., "The NIST Definition of Cloud Computing," National Institute of Standards and Technology, Sep. 2011, p. 1-3, Special Publication 800-145.

\* cited by examiner

302 {
- Line Length Angled: 0
- Line Length Horizontal: 8830
- Line Length Vertical: 5752

304 {
- Angle Weight Sharp: 0
- Angle Weight Right: 9574
- Angle Weight Gentle: 0

306 {
Thus  Line Length Base = 0 + 8830 + 5752 = 14582
      Angle Weight base = 9574 + 0 + 0

And the calculated scores are:

308 {
- dynamic   = 0 / 14582      = 0.0
- passive   = 8830 / 14582   = 0.606
- strong    = 5752 / 14582   = 0.394
- severe    = 0 / 9574       = 0.0
- rational  = 9574 / 9574    = 1.0
- gentle    = 0 / 9574       = 0.0

DETERMINING USER PREFERENCES FOR DATA VISUALIZATIONS

BACKGROUND

The present invention relates generally to the field of computing, and more specifically, to data visualizations.

Data visualizations are generally used as communication tools to help users understand information. Specifically, effective data visualizations help users in analyzing data and evidence, and make complex data more accessible and usable. The typically used data visualizations include information graphs, statistical graphs, charts, tables, and plots. For example, users may need to visually represent a particular analytical task, such as a comparison of data and/or understanding the causality of data, and the data visualization selected may be based on that particular task. Furthermore, designers of data visualizations may not only want to communicate information clearly, but may also want to stimulate viewer engagement and attention. Thus, users often want data visualizations to be both aesthetically and functionally satisfactory. Ordinarily, these design choices are based on user preferences.

SUMMARY

A method for determining user preferences for at least one data visualizations is provided. The method may include receiving the at least one data visualization. The method may also include collecting a plurality of shapes, a plurality of line segments, and a plurality of colors associated with the at least one data visualization. The method may further include converting the plurality of collected shapes and the plurality of collected line segments to a plurality of polygonal outlines. Additionally, the method may include categorizing the converted plurality of collected line segments. The method may also include measuring a plurality of lengths associated with the converted plurality of collected line segments. The method may further include identifying and categorizing a plurality of angles formed by the converted plurality of collected line segments. The method may also include determining a plurality of weighted values associated with the plurality of angles. The method may further include calculating a total length for the converted plurality of collected line segments, and calculating a total weighted value for the plurality of angles. The method may also include characterizing the converted plurality of collected line segments based on the categorization of the converted plurality of collected line segments and the plurality of angles based on the categorization of the plurality of angles. The method may further include scoring the at least one data visualization based on the characterization of the converted plurality of collected line segments and the plurality of angles plurality of angles.

A computer system for determining user preferences for at least one data visualizations is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving the at least one data visualization. The method may also include collecting a plurality of shapes, a plurality of line segments, and a plurality of colors associated with the at least one data visualization. The method may further include converting the plurality of collected shapes and the plurality of collected line segments to a plurality of polygonal outlines. Additionally, the method may include categorizing the converted plurality of collected line segments. The method may also include measuring a plurality of lengths associated with the converted plurality of collected line segments. The method may further include identifying and categorizing a plurality of angles formed by the converted plurality of collected line segments. The method may also include determining a plurality of weighted values associated with the plurality of angles. The method may further include calculating a total length for the converted plurality of collected line segments, and calculating a total weighted value for the plurality of angles. The method may also include characterizing the converted plurality of collected line segments based on the categorization of the converted plurality of collected line segments and the plurality of angles based on the categorization of the plurality of angles. The method may further include scoring the at least one data visualization based on the characterization of the converted plurality of collected line segments and the plurality of angles plurality of angles.

A computer program product for determining user preferences for at least one data visualizations is provided. The computer program product may include one or more computer-readable storage devices and program instructions stored on at least one of the one or more tangible storage devices, the program instructions executable by a processor. The computer program product may include program instructions to receive the at least one data visualization. The computer program product may also include program instructions to collect a plurality of shapes, a plurality of line segments, and a plurality of colors associated with the at least one data visualization. The computer program product may further include program instructions to convert the plurality of collected shapes and the plurality of collected line segments to a plurality of polygonal outlines. Additionally, the computer program product may also include program instructions to categorize the converted plurality of collected line segments. The computer program product may further include program instructions to measure a plurality of lengths associated with the converted plurality of collected line segments. The computer program product may also include program instructions to identify and categorize a plurality of angles formed by the converted plurality of collected line segments. The computer program product may further include program instructions to determine a plurality of weighted values associated with the plurality of angles. The computer program product may also include program instructions to calculate a total length for the converted plurality of collected line segments, and calculating a total weighted value for the plurality of angles. The computer program product may further include program instructions to characterize the converted plurality of collected line segments based on the categorization of the converted plurality of collected line segments and the plurality of angles based on the categorization of the plurality of angles. The computer program product may also include program instructions to score the at least one data visualization based on the characterization of the converted plurality of collected line segments and the plurality of angles plurality of angles.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly, to data visualizations. The following described exemplary embodiments provide a system, method and program product for determining user preferences for data visualizations. Therefore, the present embodiment has the capacity to improve the technical field of data visualizations by determining user preferences for data visualizations based on the emotive impact of data visualizations to users. Specifically, the present embodiment may determine user preferences for data visualizations by characterizing the emotive impact of data visualizations based on measurements associated with the data visualizations.

As previously described with respect to data visualizations, data visualizations are designed to communicate information clearly and to stimulate viewer engagement and attention. Specifically, designers and users of data visualizations may select data visualizations that are both aesthetically and functionally satisfactory. However, users may differ on the structure and color of data visualizations based on the users' preferences. Therefore, measurements may be used to determine user preferences for data visualizations and the affect the data visualizations may have on users. For example, the appearance of data visualizations may have an impact on user preferences. Specifically, factors such as the size, shape, and color of the data visualizations may have an emotive impact on users, and thus, influence the preference users have for the data visualizations. As such, it may be advantageous, among other things, to provide a system, method and program product for determining user preferences for data visualizations by characterizing the emotive impact of data visualizations based on measurements associated with the data visualizations. Therefore, the system, method and program product may be used to learn user preferences for data visualizations based on the characterization of the data visualization, as well as used to recommend data visualizations according to the learned user preferences.

According to at least one implementation of the present embodiment, data visualizations may be received. Then, the shapes and line segments associated with the received data visualization may be collected. Thereafter, the shapes and line segments may be converted to polygonal outlines. Next, the line segments may be categorized. Then, the lengths of the line segments may be calculated. Additionally, the angles formed by the line segments may be identified and categorized. Next, weighted values for the angles may be determined. Furthermore, the total length of the collected line segments and the total weighted value of the angles may be calculated. Thereafter, the collected line segments and the angles may be characterized. Then, the data visualization may be scored based on the characterizations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for determining user preferences for data visualizations by characterizing the emotive impact of the data visualizations based on data visualization measurements.

According to at least one implementation, at least one data visualization may be received. Then, one or more shapes and line segments associated with the at least one received data visualization may be collected. Thereafter, the collected shapes and line segments may be converted to polygonal outlines. Next, the collected line segments may be categorized. Then, the lengths of the line segments may be calculated. Additionally, the angles formed by the line segments may be identified and categorized. Next, weighted values for the angles may be determined. Furthermore, the total length of the collected line segments and the total weighted value of the angles may be calculated. Thereafter, the collected line segments and the angles may be characterized. Then, the data visualization may be scored based on the characterized line segments and characterized angles.

Figure 1:
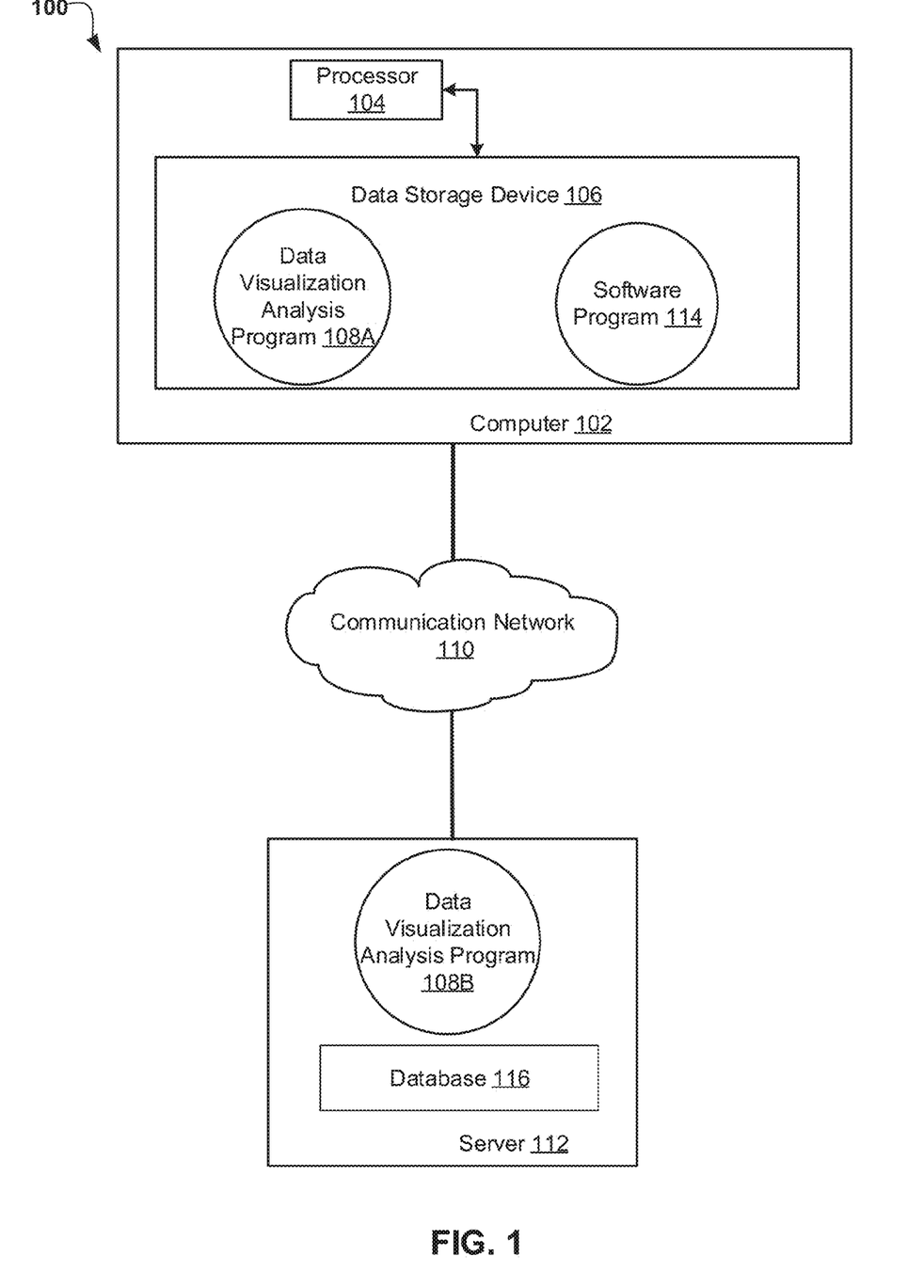
FIG. 1 illustrates a networked computer environment according to one embodiment.

Referring now to FIG. 1, an exemplary networked computer environment 100 in accordance with one embodiment is depicted. The networked computer environment 100 may include a computer 102 with a processor 104 and a data storage device 106 that is enabled to run a data visualization analysis program 108A and a software program 114. The software program 114 may be an application program such as an internet browser and an email program. The data visualization analysis program 108A may communicate with the software program 114. The networked computer environment 100 may also include a server 112 that is enabled to run a data visualization analysis program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 5, server computer 112 may include internal components 800a and external components 900a, respectively and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the data visualization analysis program 108A, 108B may interact with a database 116 that may be embedded in various storage devices, such as, but not limited to a mobile device 102, a networked server 112, or a cloud storage service.

According to the present embodiment, a program, such as a data visualization analysis program 108A and 108B may run on the client computer 102 or on the server computer 112 via a communications network 110. The data visualization analysis program 108A, 108B may determine user preferences for data visualizations. Specifically, a user using a computer, such as computer 102, may run a data visualization analysis program 108A, 108B, that interacts with a database 116, to determine the user preferences for data visualizations by characterizing the emotive impact of data visualizations based on data visualization measurements.

Figure 2:
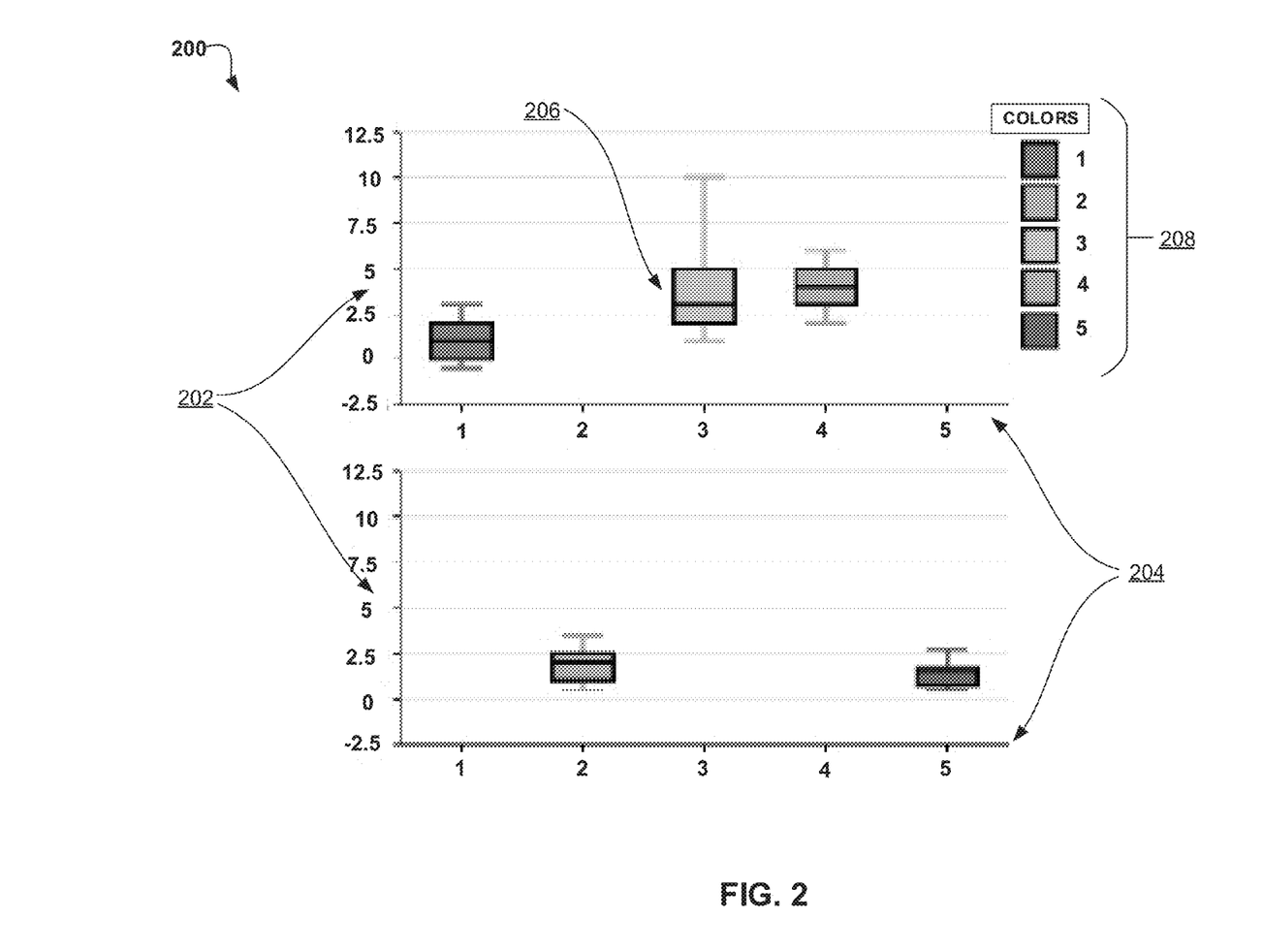
FIG. 2 is an example of a data visualization according to one embodiment.

Referring now to FIG. 2, an example of a data visualization 200 in accordance with one embodiment is depicted. As previously described in FIG. 1, the data visualization analysis program 108A, 108B (FIG. 1) may receive and measure data visualizations to determine user preferences. Specifically, the data visualization analysis program 108A, 108B (FIG. 1) may collect the set of shapes, the line segments, and the colors comprising the data visualization. Then, the data visualization analysis program 108A, 108B (FIG. 1) may convert the set of shapes and the line segments to polygonal outlines. Next, the data visualization analysis program 108A, 108B (FIG. 1) may measure the line segments and the angles formed by the line segments. Furthermore, to determine the user preferences, the data visualization analysis program 108A, 108B (FIG. 1) may characterize the data visualizations based on the measurements. For example, the data visualization 200 may be a bar graph having line segments such as a y-axis 202 and an x-axis 204, a set of shapes such as squares 206 that have horizontal and vertical line segments forming the set of shapes, and different colors 208 presented on different parts of the data visualization 200. As such, the data visualization analysis program 108A, 108B (FIG. 1) may measure the line segments and the angles formed by the line segments, and characterize the data visualization 200 based on the measurements, to determine the user preferences for bar graphs.

Figure 3:
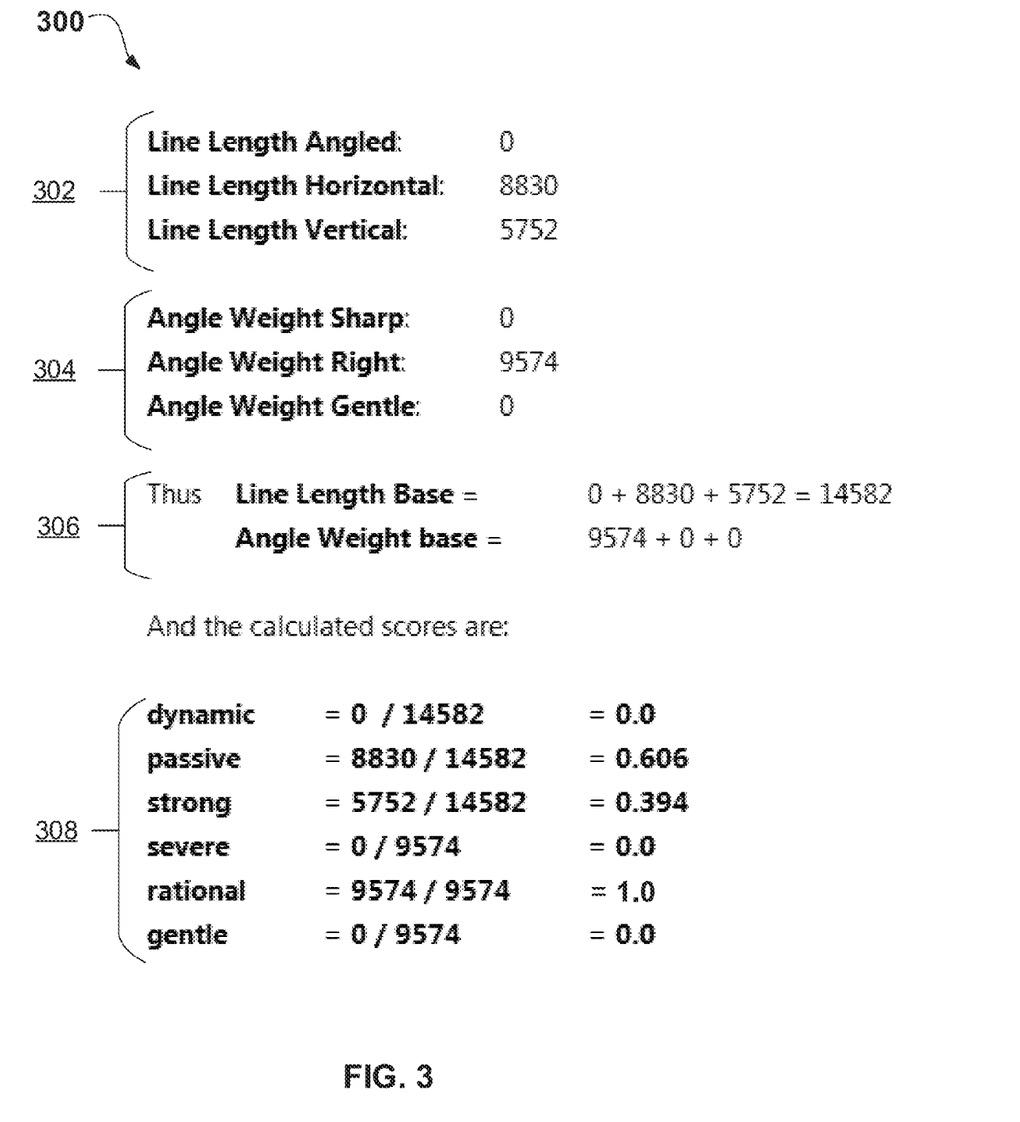
FIG. 3 is an example of data visualization measurements for determining user preferences for data visualizations according to one embodiment.

Referring now to FIG. 3, an example of data visualization measurements 300 in accordance with one embodiment of the present invention is depicted. Specifically, the data visualization analysis program 108A, 108B (FIG. 1) may categorize the line segments associated with the polygonal outlines as angled, horizontal, or vertical. Furthermore, the data visualization analysis program 108A, 108B (FIG. 1) may categorize the angles formed by the line segments as sharp, right, or gentle. Then, at 302, the data visualization analysis program 108A, 108B (FIG. 1) may measure the lengths of the line segments by calculating the number of pixels that form the line segments. Additionally, at 304, the data visualization analysis program 108A, 108B (FIG. 1) may calculate the angles formed by the line segments by determining weighted values for the angles. Then, at 306, the data visualization analysis program 108A, 108B (FIG. 1) may calculate the total length of the line segments, and calculate the total weighted value of the angles. Furthermore, the data visualization analysis program 108A, 108B (FIG. 1) may characterize the line segments and the angles. Next, at 308, the data visualization analysis program 108A, 108B (FIG. 1) may score the data visualization 200 (FIG. 2) based on the characterizations by dividing the lengths of the characterized line segments by the total length of the line segments, and dividing the weighted value of the characterized angles by the total weighted value of the angles.

For example, the data visualization measurements 300 may be based on the data visualization 200 (FIG. 2) such as the bar graph. As such, the data visualization analysis program 108A, 108B (FIG. 1) may collect the set of shapes, the line segments, and the colors associated with the bar graph 200 (FIG. 2). Next, the data visualization analysis program 108A, 108B (FIG. 1) may convert the set of shapes and the line segments to polygonal outlines. Thereafter, the data visualization analysis program 108A, 108B (FIG. 1) may categorize the line segments. Specifically, the data visualization analysis program 108A, 108B (FIG. 1) may determine that the bar graph 200 (FIG. 2) comprises horizontal and vertical line segments, and comprises no angled line segments. Thus, the data visualization analysis program 108A, 108B (FIG. 1) may categorize the line segments associated with the data visualization 200 (FIG. 2) as horizontal and vertical. Furthermore, the data visualization analysis program 108A, 108B (FIG. 1) may categorize the angles formed by the line segments. Specifically, the data visualization analysis program 108A, 108B (FIG. 1) may determine that the data visualization 200 (FIG. 2) comprises horizontal and vertical line segments that form right angles. Therefore, the data visualization analysis program 108A, 108B (FIG. 1) may categorize the angles formed by the line segments as right.

Next, at 302, the data visualization analysis program 108A, 108B (FIG. 1) may measure the lengths of the line segments by calculating the number of pixels forming the line segments. Specifically, the data visualization analysis program 108A, 108B (FIG. 1) may determine that the lengths of the horizontal line segments are 8830 pixels. Furthermore, the data visualization analysis program 108A, 108B (FIG. 1) may determine that the lengths of the vertical line segments are 5752 pixels. Then, at 304, the data visualization analysis program 108A, 108B (FIG. 1) may calculate the angles formed by the line segments by determining weighted values for the angles. Specifically, the data visualization analysis program 108A, 108B (FIG. 1) may determine that the weighted value of the right angles is 9574 pixels. Then, at 306, the data visualization analysis program 108A, 108B (FIG. 1) may calculate the total length of the line segments and the total weighted value of the angles. Therefore, the data visualization analysis program 108A, 108B (FIG. 1) may determine that the total length of the line segments is 14582 pixels and that the total weighted value is 9574 pixels.

Next, the data visualization analysis program 108A, 108B (FIG. 1) may characterize the line segments and the angles based on the categorizations of the line segments and the angles. Specifically, the data visualization analysis program 108A, 108B (FIG. 1) may characterize the angled line segments as dynamic, the horizontal line segments as passive, and the vertical line segments as strong. Furthermore, the data visualization analysis program 108A, 108B (FIG. 1) may characterize the sharp angles as severe, the right angles as rational, and the gentle angles as gentle. Then, at 308, based on the characterizations, the data visualization analysis program 108A, 108B (FIG. 1) may score the data visualization 200 (FIG. 2) by dividing the lengths of the line segments by the total length of the line segments, and dividing the weighted values of the angles by the total weighted value of the angles. Therefore, the data visualization analysis program 108A, 108B (FIG. 1) may determine the following scores for the data visualization 200 (FIG. 2): dynamic=0.0, passive=0.606, strong=0.394, severe=0.0, rational=1.0, and gentle=0.0. As such, based on the calculated scores, the data visualization analysis program 108A, 108B (FIG. 1) may characterize the emotive impact of the data visualization 200 (FIG. 2) as passive, strong, and very rational.

Figure 4:
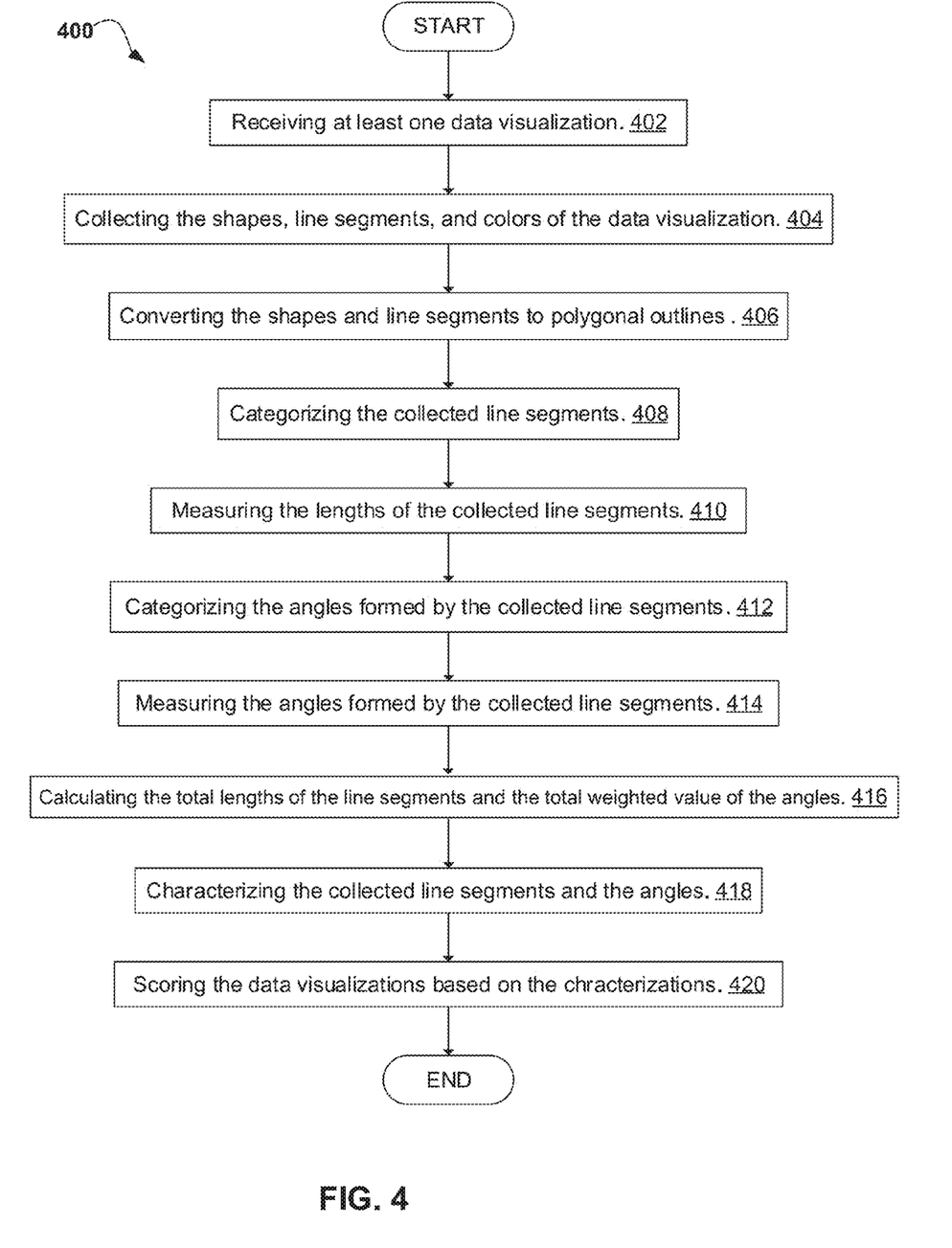
FIG. 4 is an operational flowchart illustrating the steps carried out by a program for determining user preferences for data visualizations according to one embodiment.

Referring now to FIG. 4, an operational flowchart 400 illustrating the steps carried out by a program for determining user preferences for data visualizations is depicted. At 402, the data visualization analysis program 108A, 108B (FIG. 1) may receive at least one data visualization. Specifically, the data visualization analysis program 108A, 108B (FIG. 1) may receive data visualizations in formats such as, but not limited to, portable document format (PDF) and scalable vector graphic (SVG). For example, the data visualization analysis program 108A, 108B (FIG. 1) may receive a data visualization 200 (FIG. 2), such as a bar graph.

Next, at 404 the data visualization analysis program 108A, 108B (FIG. 1) may collect the set of shapes, the line segments, and the colors associated with the data visualization 200 (FIG. 2). As previously described in FIG. 2, the data visualization analysis program 108A, 108B (FIG. 1) may receive a data visualization 200 (FIG. 2), such as a bar graph. Furthermore, the data visualization analysis program 108A, 108B (FIG. 1) may collect the set of shapes, the line segments, and the colors associated with the data visualization 200 (FIG. 2). For example, the data visualization analysis program 108A, 108B (FIG. 1) may collect the line segments such as the y-axis 202 (FIG. 2) and the x-axis 204 (FIG. 2), the set of shapes such as squares 206 (FIG. 2) that have horizontal and vertical line segments forming the set of shapes, and the different colors 208 (FIG. 2) presented on different parts of the data visualization 200 (FIG. 2).

Then, at 406, the data visualization analysis program 108A, 108B (FIG. 1) may convert the collected set of shapes and line segments to polygonal outlines. As previously described at step 404, the data visualization analysis program 108A, 108B (FIG. 1) may collect the set of shapes, the line segments, and the colors associated with a data visualization 200 (FIG. 2). As such, the data visualization analysis program 108A, 108B (FIG. 1) may convert the collected set of shapes and collected line segments to polygonal outlines to provide a mechanism for measuring the data visualizations 200 (FIG. 2). For example, and as previously described in FIG. 2, the data visualization analysis program 108A, 108B (FIG. 1) may collect the set of shapes and the line segments associated with the data visualization 200 (FIG. 2), such as the bar graph. Therefore, the data visualization analysis program 108A, 108B (FIG. 1) may convert the collected set of shapes and the collected line segments to polygonal outlines to provide a mechanism for measuring the data visualization 200 (FIG. 2).

Next, at 408, the data visualization analysis program 108A, 108B (FIG. 1) may categorize the collected line segments. As previously described in FIG. 3, the data visualization analysis program 108A, 108B (FIG. 1) may categorize the collected line segments associated with the polygonal outlines as angled, horizontal, or vertical. Specifically, according to one embodiment, the data visualization analysis program 108A, 108B (FIG. 1) may use the following criteria to categorize the collected line segments: vertical=line segments within 5 degrees of being a vertical line, horizontal=line segments within 5 degrees of being a horizontal line, and angled=line segments not meeting the vertical and horizontal line segment criteria. For example, based on the line segment criteria, the data visualization analysis program 108A, 108B (FIG. 1) may determine that the data visualization 200 (FIG. 2) comprises horizontal and vertical line segments, and no angled line segments. Therefore, the data visualization analysis program 108A, 108B (FIG. 1) may categorize the collected line segments associated with the data visualization 200 (FIG. 2) as vertical and horizontal.

Then, at 410, the data visualization analysis program 108A, 108B (FIG. 1) may measure the lengths of the collected line segments. Specifically, the data visualization analysis program 108A, 108B (FIG. 1) may measure the lengths of the collected line segments by calculating the number of pixels forming the collected line segments. For example, and as previously described in FIG. 3, the data visualization analysis program 108A, 108B (FIG. 1) may determine that the lengths of the collected horizontal line segments are 8830 pixels (FIG. 3). Furthermore, the data visualization analysis program 108A, 108B (FIG. 1) may determine that the lengths of the vertical line segments are 5752 pixels (FIG. 3).

Next, at 412, the data visualization analysis program 108A, 108B (FIG. 1) may categorize the angles formed by the collected line segments. As previously described in FIG. 3, the data visualization analysis program 108A, 108B (FIG. 1) may categorize the angles formed by the collected line segments as sharp, right, or gentle. Specifically, according to one embodiment, the data visualization analysis program 108A, 108B (FIG. 1) may use the following criteria to categorize the angles formed by the collected line segments: sharp=angles less than 45 degrees, right=angles within 5 degrees of forming a right angle, and gentle=angles over 145 degrees. For example, based on the angle criteria, the data visualization analysis program 108A, 108B (FIG. 1) may determine that the bar graph 200 (FIG. 2) comprises horizontal and vertical line segments that form right angles. Therefore, the data visualization analysis program 108A, 108B (FIG. 1) may categorize the collected angles formed by the line segments as right.

Then, at 414, the data visualization analysis program 108A, 108B (FIG. 1) may measure the angles formed by the collected line segments by determining weighted values for the collected angles. As previously described in FIG. 3, the data visualization analysis program 108A, 108B (FIG. 1) may measure the angles formed by the collected line segments by determining weighted values for the angles. Specifically, according to one embodiment, the data visualization analysis program 108A, 108B (FIG. 1) may use the following criteria to determine weighted values for the angles formed by the collected line segments: for angles formed by at least two line segments, the weighted value is the minimum length of the line segment forming the angle. For example, a right angle may be formed by a line segment with a length of 7 pixels and a line segment with a length of 12 pixels; therefore, the weighted value of the right angle is 7 pixels, since the line segment with the length of 7 pixels is the minimum length as compared to the line segment with the length of 12 pixels. For example, as previously described in FIG. 3, the data visualization analysis program 108A, 108B (FIG. 1) may determine a weighted value for the sum of right angles formed in the data visualization 200 (FIG. 2). Specifically, the data visualization analysis program 108A, 108B (FIG. 1) may determine that the weighted value of the right angles is 9574 pixels (FIG. 3). Furthermore, the data visualization analysis program 108A, 108B (FIG. 1) may determine that the lengths of the vertical line segments are 5752 pixels (FIG. 3).

Next, at 416, the data visualization analysis program 108A, 108B (FIG. 1) may calculate the total length of the collected line segments, and calculate the total weighted value of the angles. Specifically, the data visualization analysis program 108A, 108B (FIG. 1) may calculate the total length of the line segments by calculating the sum of the collected line segments, and may calculate the total weighted value of the angles by determining the sum of the weighted values for the categorized angles. For example, and as previously described in FIG. 3, the data visualization analysis program 108A, 108B (FIG. 1) may calculate the total length of the collected line segments associated with the bar graph 200 (FIG. 2) by adding the horizontal line segments and the vertical line segments. Therefore, the data visualization analysis program 108A, 108B (FIG. 1) may determine that the total length of the collected line segments is 14582 (FIG. 3). Furthermore, the data visualization analysis program 108A, 108B (FIG. 1) may determine that the total weighted value of the angles for the bar graph 200 (FIG. 2) is 9574 (FIG. 3).

Then, at 418, the data visualization analysis program 108A, 108B (FIG. 1) may characterize the collected line segments and the angles. Specifically, the data visualization analysis program 108A, 108B (FIG. 1) may characterize the collected line segments and the angles based on the categorization of the collected line segments and the angles. Therefore, according to one embodiment, the data visualization analysis program 108A, 108B (FIG. 1) may use the following criteria to characterize the collected line segments based on the categorization of the line segments: line segments categorized as vertical=strong, line segments categorized as horizontal=passive, line segments categorized as angled=dynamic. Furthermore, according to one embodiment, the data visualization analysis program 108A, 108B (FIG. 1) may use the following criteria to characterize the angles based on the categorization of the angles: angles categorized as sharp=severe, angles categorized as right=rational, angles categorized as gentle=gentle.

Next, at 420, the data visualization analysis program 108A, 108B (FIG. 1) may score the data visualization based on the characterizations. Specifically, the data visualization analysis program 108A, 108B (FIG. 1) may score the data visualization by calculating values for the characterized line segments and the characterized angles. As previously described in step 418, the data visualization analysis program 108A, 108B (FIG. 1) may characterize the collected line segments as strong, passive, and dynamic. Furthermore, the data visualization analysis program 108A, 108B (FIG. 1) may characterize the angles as severe, rational, and gentle. Then, the data visualization analysis program 108A, 108B (FIG. 1) may calculate values for the characterized line segments and the characterized angles by dividing the lengths of the line segments by the total length of the line segments, and by dividing the weighted values of the angles by the total weighted value of the angles, respectively. For example, and as previously described in FIG. 3, the data visualization analysis program 108A, 108B (FIG. 1) may divide the lengths of the line segments by the total length of the line segments to receive the following scores based on the characterized line segments: dynamic=0.0, passive=0.606, strong=0.394. Furthermore, the data visualization analysis program 108A, 108B (FIG. 1) may divide the weighted value of the angles by the total weighted value of the angles to receive the following scores based on the characterized angles: severe=0.0, rational=1.0, and gentle=0.0. As such, based on the calculated scores, the data visualization analysis program 108A, 108B (FIG. 1) may characterize the data visualization 200 (FIG. 2) as passive, strong, and very rational.

It may be appreciated that FIGS. 1-4 provide only an illustration of one implementation and does not imply any limitations with regard to how different embodiments may be implemented. Many modifications to the depicted environments may be made based on design and implementation requirements. For example, in step 404 (FIG. 4), the data visualization analysis program 108A, 108B (FIG. 1) may identify, in the collected set of shapes, the shapes that may include data, and may tag the shapes that include data with a Boolean value. Furthermore, the data visualization analysis program 108A, 108B (FIG. 1) may multiply the lengths/weighted values of the shapes that include data by a fixed amount to emphasize the shapes that include data. Additionally, the data visualization analysis program 108A, 108B (FIG. 1) may calculate the area of the polygonal outlines. Furthermore, the data visualization analysis program 108A, 108B (FIG. 1) may categorize the collected colors, determine weighted values for the collected colors, and measure the ratio of the weighted values for the collected colors to the total area of the polygonal outlines. Also, according to one implementation of the present embodiment, in step 410 (FIG. 4) the data visualization analysis program 108A, 108B (FIG. 1) may determine that line segments with a length of more than 40 pixels may be measured as 40 pixels. Furthermore, according to implementation, in step 410 (FIG. 4), the data visualization analysis program 108A, 108B (FIG. 1) may determine that line segments less than 3 pixels may be ignored.

Figure 5:
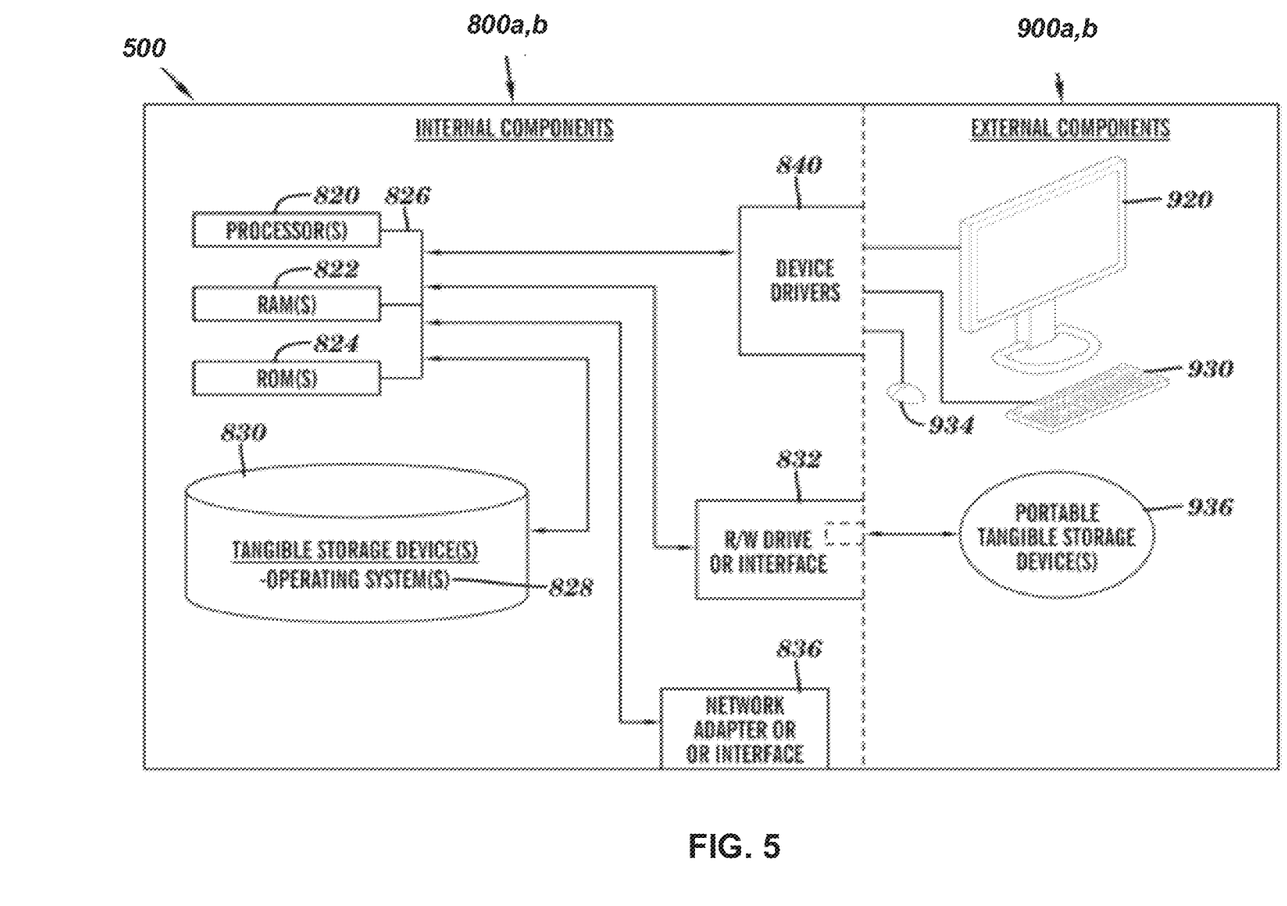
FIG. 5 is a block diagram of the system architecture of a program for determining user preferences for data visualizations according to one embodiment.

FIG. 5 is a block diagram 500 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800 a, b and external components 900 a, b illustrated in FIG. 5. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, the software program 114 (FIG. 1), the data visualization analysis program 108A (FIG. 1) in client computer 102 (FIG. 1), and the data visualization analysis program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as a data visualization analysis program 108A and 108B (FIG. 1), can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The data visualization analysis program 108A (FIG. 1) and software program 114 (FIG. 1) in client computer 102 (FIG. 1), and the data visualization analysis program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the data visualization analysis program 108A (FIG. 1) and software program 114 (FIG. 1) in client computer 102 (FIG. 1) and the data visualization analysis program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
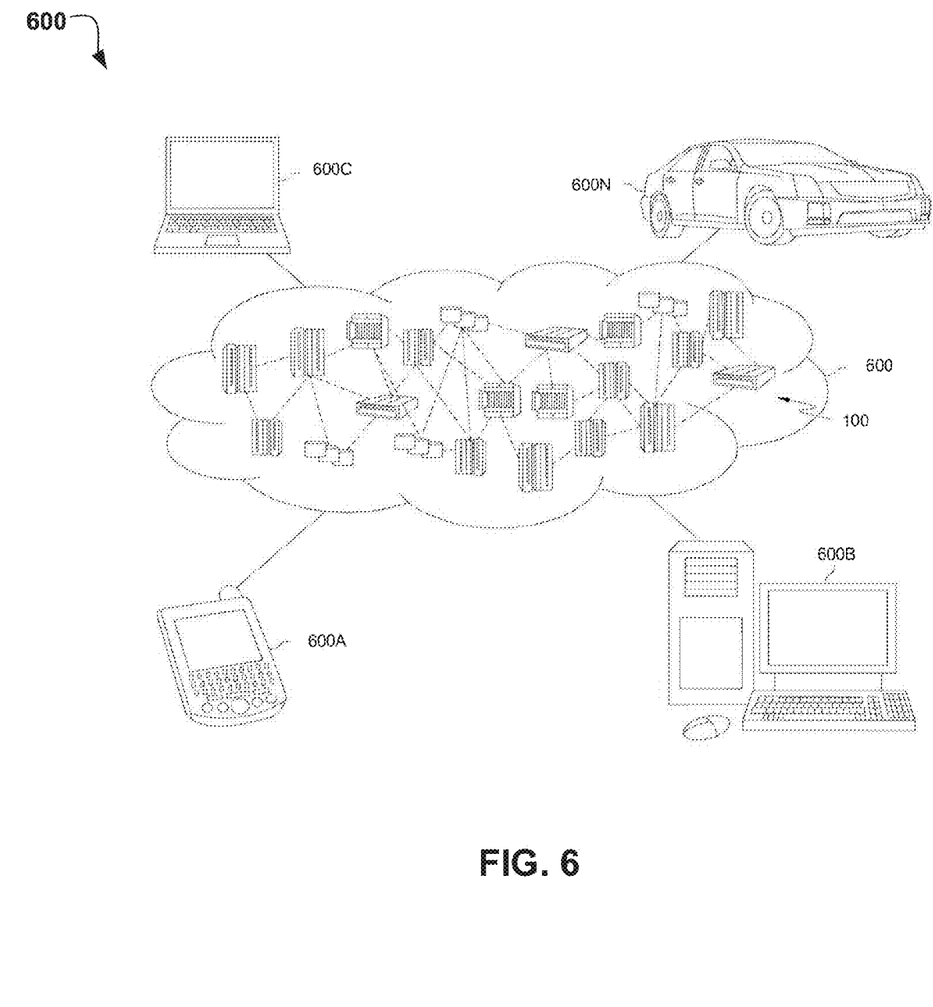
FIG. 6 is a block diagram of an illustrative cloud computing environment including the computer system depicted in FIG. 1, in accordance with an embodiment of the present disclosure.

Referring now to FIG. 6, illustrative cloud computing environment 600 is depicted. As shown, cloud computing environment 600 comprises one or more cloud computing nodes 100 with which local computing devices used by cloud consumers, such as, for example, personal digital assistant (PDA) or cellular telephone 600A, desktop computer 600B, laptop computer 600C, and/or automobile computer system 600N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that computing nodes 100 and cloud computing environment 600 can communicate with any type of computerized device over any type of network and/or network addressable connection (e.g., using a web browser).

Figure 7:
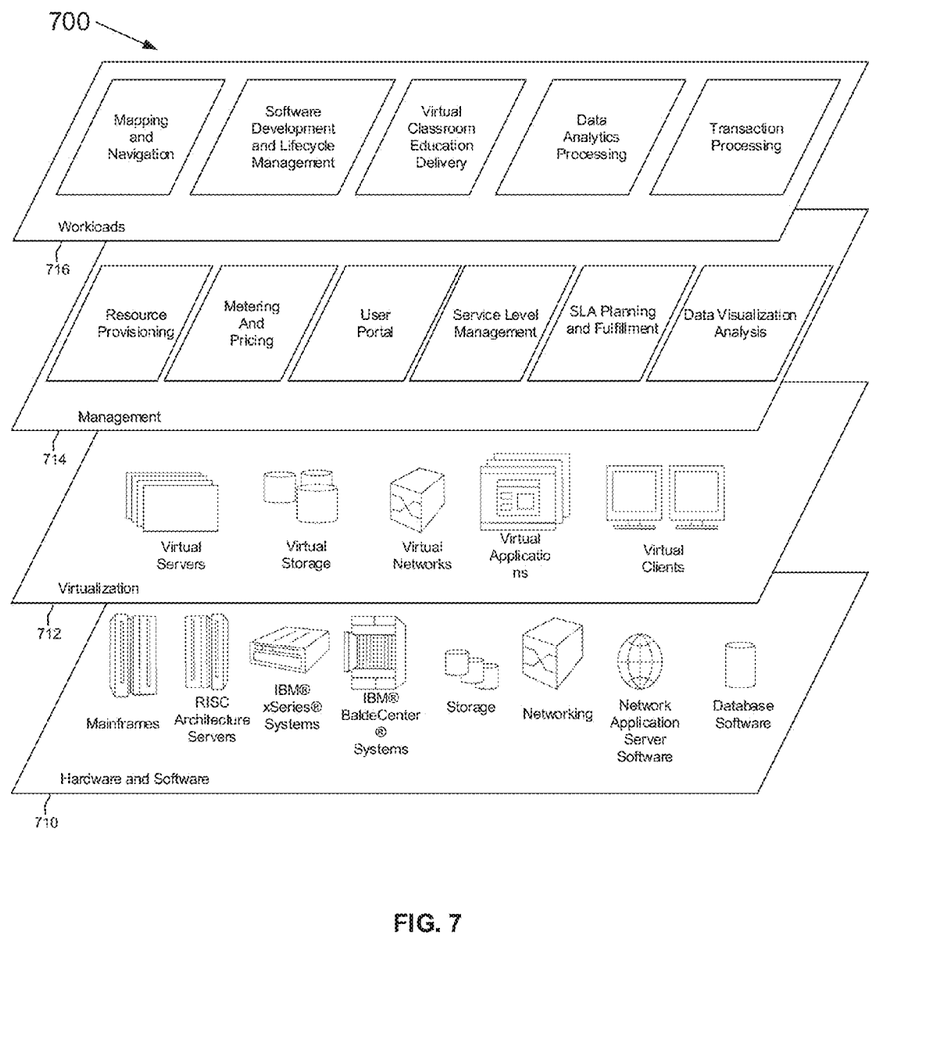
FIG. 7 is a block diagram of functional layers of the illustrative cloud computing environment of FIG. 6, in accordance with an embodiment of the present disclosure.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 710 includes hardware and software components. Examples of hardware components include: mainframes; RISC (Reduced Instruction Set Computer) architecture based servers; storage devices; networks and networking components. In some embodiments, software components include network application server software.

Virtualization layer 712 provides an abstraction layer from which the following examples of virtual entities may be provided: virtual servers; virtual storage; virtual networks, including virtual private networks; virtual applications and operating systems; and virtual clients.

In one example, management layer 714 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A Data Visualization Analysis program may determine user preferences for data visualizations by characterizing the emotive impact of data visualizations based on measurements associated with the data visualizations.

Workloads layer 716 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining user preferences for at least one data visualization, the method comprising:
   receiving the at least one data visualization;
   collecting a plurality of shapes, a plurality of line segments, and a plurality of colors associated with the at least one data visualization;
   converting the plurality of collected shapes and the plurality of collected line segments to a plurality of polygonal outlines;
   categorizing the converted plurality of collected line segments;
   measuring a plurality of lengths associated with the converted plurality of collected line segments;
   identifying and categorizing a plurality of angles formed by the converted plurality of collected line segments;

determining a plurality of weighted values associated with the plurality of angles;
calculating a total length for the converted plurality of collected line segments, and calculating a total weighted value for the plurality of angles;
characterizing the converted plurality of collected line segments based on the categorization of the converted plurality of collected line segments and the plurality of angles based on the categorization of the plurality of angles;
scoring the at least one data visualization based on the characterization of the converted plurality of collected line segments and the plurality of angles; and
determining the user preferences for the at least one data visualization by presenting an impact characterization to users based on the scored at least one data visualization, wherein the impact characterization is a determination of an impact of the at least one data visualization on a plurality of users.

2. The method of claim 1, wherein the at least one data visualization is in a format selected from a group comprising at least one of a portable document format and a vector graphic.

3. The method of claim 1, wherein the categorizing the converted plurality of collected line segments is based on a selection from a group comprising at least one of an angled line segment, a horizontal line segment, and a vertical line segment.

4. The method of claim 1, wherein the categorizing the plurality of angles is based on a selection from a group comprising at least one of a sharp angle, a right angle, and a gentle angle.

5. The method of claim 1, wherein the measuring the plurality of lengths associated with the converted plurality of collected line segments and the determining the plurality of weighted values associated with the plurality of angles are based on a plurality of pixels.

6. The method of claim 1, wherein the scoring the at least one data visualization is based on a ratio of the plurality of lengths associated with the converted plurality of collected line segments to the total length for the converted plurality of collected line segments, and a ratio of the plurality of weighted values associated with the plurality of angles to the total weighted value for the plurality of angles.

7. The method of claim 1, further comprising:
calculating a total area of the plurality of polygonal outlines;
categorizing the plurality of collected colors;
determining a plurality weighted values associated with the collected colors; and
calculating a ratio of the plurality of weighted values associated with the plurality of collected colors to the total area of the polygonal outlines.

8. A computer system for determining user preferences for at least one data visualization, comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
receiving the at least one data visualization;
collecting a plurality of shapes, a plurality of line segments, and a plurality of colors associated with the at least one data visualization;
converting the plurality of collected shapes and the plurality of collected line segments to a plurality of polygonal outlines;
categorizing the converted plurality of collected line segments;
measuring a plurality of lengths associated with the converted plurality of collected line segments;
identifying and categorizing a plurality of angles formed by the converted plurality of collected line segments;
determining a plurality of weighted values associated with the plurality of angles;
calculating a total length for the converted plurality of collected line segments, and calculating a total weighted value for the plurality of angles;
characterizing the converted plurality of collected line segments based on the categorization of the converted plurality of collected line segments and the plurality of angles based on the categorization of the plurality of angles;
scoring the at least one data visualization based on the characterization of the converted plurality of collected line segments and the plurality of angles; and
determining the user preferences for the at least one data visualization by presenting an impact characterization to users based on the scored at least one data visualization, wherein the impact characterization is a determination of an impact of the at least one data visualization on a plurality of users.

9. The computer system of claim 8, wherein the at least one data visualization is in a format selected from a group comprising at least one of a portable document format and a vector graphic.

10. The computer system of claim 8, wherein the categorizing the converted plurality of collected line segments is based on a selection from a group comprising at least one of an angled line segment, a horizontal line segment, and a vertical line segment.

11. The computer system of claim 8, wherein the categorizing the plurality of angles is based on a selection from a group comprising at least one of a sharp angle, a right angle, and a gentle angle.

12. The computer system of claim 8, wherein the measuring the plurality of lengths associated with the converted plurality of collected line segments and the determining the plurality of weighted values associated with the plurality of angles are based on a plurality of pixels.

13. The computer system of claim 8, wherein the scoring the at least one data visualization is based on a ratio of the plurality of lengths associated with the converted plurality of collected line segments to the total length for the converted plurality of collected line segments, and a ratio of the plurality of weighted values associated with the plurality of angles to the total weighted value for the plurality of angles.

14. The computer system of claim 8, further comprising:
calculating a total area of the plurality of polygonal outlines;
categorizing the plurality of collected colors;
determining a plurality weighted values associated with the collected colors; and
calculating a ratio of the plurality of weighted values associated with the plurality of collected colors to the total area of the polygonal outlines.

15. A computer program product for determining user preferences for at least one data visualization, comprising:
one or more computer-readable storage devices and program instructions stored on at least one of the one or more tangible storage devices, the program instructions executable by a processor, the program instructions comprising:

program instructions to receive the at least one data visualization;

program instructions to collect a plurality of shapes, a plurality of line segments, and a plurality of colors associated with the at least one data visualization;

program instructions to convert the plurality of collected shapes and the plurality of collected line segments to a plurality of polygonal outlines;

program instructions to categorize the converted plurality of collected line segments;

program instructions to measure a plurality of lengths associated with the converted plurality of collected line segments;

program instructions to identify and categorize a plurality of angles formed by the converted plurality of collected line segments;

program instructions to determine a plurality of weighted values associated with the plurality of angles;

program instructions to calculate a total length for the converted plurality of collected line segments, and calculate a total weighted value for the plurality of angles;

program instructions to characterize the converted plurality of collected line segments based on the categorization of the converted plurality of collected line segments and the plurality of angles based on the categorization of the plurality of angles;

program instructions to score the at least one data visualization based on the characterization of the converted plurality of collected line segments and the plurality of angles; and program instructions to determine the user preferences for the at least one data visualization by presenting an impact characterization to users based on the scored at least one data visualization, wherein the impact characterization is a determination of an impact of the at least one data visualization on a plurality of users.

16. The computer program product of claim 15, wherein the program instructions to categorize the converted plurality of collected line segments is based on a selection from a group comprising at least one of an angled line segment, a horizontal line segment, and a vertical line segment.

17. The computer program product of claim 15, wherein the program instructions to categorize the plurality of angles is based on a selection from a group comprising at least one of a sharp angle, a right angle, and a gentle angle.

18. The computer program product of claim 15, wherein the program instructions to measure the plurality of lengths associated with the converted plurality of collected line segments and the program instructions to determine the plurality of weighted values associated with the plurality of angles are based on a plurality of pixels.

19. The computer program product of claim 15, wherein the file path information associated with the computer file comprises a plurality of synchronization status indicators.

20. The computer program product of claim 15, further comprising:

program instructions to calculate a total area of the plurality of polygonal outlines;

program instructions to categorize the plurality of collected colors;

program instructions to determine a plurality weighted values associated with the collected colors; and program instructions to calculate a ratio of the plurality of weighted values associated with the plurality of collected colors to the total area of the polygonal outlines.

* * * * *